United States Patent
Griffin et al.

(10) Patent No.: US 12,165,141 B1
(45) Date of Patent: Dec. 10, 2024

(54) BIOMETRICS-BASED E-SIGNATURES FOR PRE-AUTHORIZATION AND ACCEPTANCE TRANSFER

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 63 days.

(21) Appl. No.: 17/887,357

(22) Filed: Aug. 12, 2022

Related U.S. Application Data

(62) Division of application No. 15/967,311, filed on Apr. 30, 2018, now Pat. No. 11,436,597.

(Continued)

(51) Int. Cl.
*G06Q 20/40* (2012.01)
*G06Q 20/38* (2012.01)
(Continued)

(52) U.S. Cl.
CPC ..... *G06Q 20/3823* (2013.01); *G06Q 20/3825* (2013.01); *G06Q 20/3829* (2013.01);
(Continued)

(58) Field of Classification Search
CPC .......... G06Q 20/3823; G06Q 20/3825; G06Q 20/3829; G06Q 20/40145; G06Q 2220/00;
(Continued)

(56) References Cited

U.S. PATENT DOCUMENTS

| 5,764,789 A | 6/1998 | Pare, Jr. et al. |
| 6,553,494 B1 | 4/2003 | Glass |

(Continued)

FOREIGN PATENT DOCUMENTS

WO   WO-2011005869 A2 *  1/2011  ............ G06F 21/64

OTHER PUBLICATIONS

Phillip Griffin, Singcryption Information Assets, ISSA Journal, Jun. 2012 (Year: 2012).*

(Continued)

*Primary Examiner* — Neha Patel
*Assistant Examiner* — Chunling Ding
(74) *Attorney, Agent, or Firm* — Foley & Lardner LLP

(57) ABSTRACT

A method includes receiving an agreement associated with a signing party by a computing system, receiving a biometric sample captured from the signing party by the computing system, generating a hash of the agreement by the computing system, and receiving a secret knowledge factor by the computing system. The method further includes generating an encryption key using the secret knowledge factor as an input to a password authenticated key exchange protocol by the computing system and generating a biometric-based electronic signature token by encrypting the biometric sample and the hash of the agreement with the encryption key by the computing system. The method further includes generating a smart contract based on the agreement by the computing system. The smart contract includes terms of the agreement and the biometric-based electronic signature token. The biometric-based electronic signature token providing biometric-based pre-authorization to be initiated by the smart contract.

14 Claims, 3 Drawing Sheets

Related U.S. Application Data

(60) Provisional application No. 62/492,679, filed on May 1, 2017.

(51) Int. Cl.
*H04L 9/14* (2006.01)
*H04L 9/30* (2006.01)
*H04L 9/32* (2006.01)

(52) U.S. Cl.
CPC ......... *G06Q 20/40145* (2013.01); *H04L 9/14* (2013.01); *H04L 9/30* (2013.01); *H04L 9/3213* (2013.01); *H04L 9/3231* (2013.01); *H04L 9/3242* (2013.01); *H04L 9/3247* (2013.01); *G06Q 2220/00* (2013.01)

(58) Field of Classification Search
CPC . H04L 9/14; H04L 9/30; H04L 9/3213; H04L 9/3231; H04L 9/3242; H04L 9/3247
See application file for complete search history.

(56) References Cited

U.S. PATENT DOCUMENTS

| | | | |
|---|---|---|---|
| 6,745,327 B1 | 6/2004 | Messing | |
| 7,162,635 B2 | 1/2007 | Bisbee et al. | |
| 7,308,581 B1* | 12/2007 | Geosimonian | G06F 21/34 713/184 |
| 8,108,678 B1* | 1/2012 | Boyen | H04L 9/0847 713/176 |
| 10,255,135 B2* | 4/2019 | Resch | H04L 9/0861 |
| 10,951,413 B2* | 3/2021 | Gehrmann | H04L 9/0866 |
| 2003/0065934 A1 | 4/2003 | Angelo et al. | |
| 2003/0074326 A1 | 4/2003 | Byers | |
| 2003/0105966 A1* | 6/2003 | Pu | G06F 21/31 713/186 |
| 2005/0222932 A1 | 10/2005 | Murashita et al. | |
| 2005/0251688 A1 | 11/2005 | Nanavati et al. | |
| 2006/0029261 A1* | 2/2006 | Hoffman | H04L 9/3226 382/115 |
| 2009/0070266 A1 | 3/2009 | Shah et al. | |
| 2010/0002485 A1 | 1/2010 | Janzen | |
| 2010/0082975 A1 | 4/2010 | Metke et al. | |
| 2013/0212397 A1 | 8/2013 | Lehwany | |
| 2014/0032924 A1* | 1/2014 | Durham | G06F 21/32 713/186 |
| 2015/0215316 A1 | 7/2015 | Zeljkovic et al. | |
| 2016/0203496 A1 | 7/2016 | Guerrero et al. | |
| 2016/0219046 A1* | 7/2016 | Ballard | H04L 63/0861 |
| 2016/0292804 A1 | 10/2016 | Takahashi et al. | |
| 2016/0300234 A1 | 10/2016 | Moss-Pultz et al. | |
| 2016/0323109 A1 | 11/2016 | McCoy et al. | |
| 2016/0330027 A1 | 11/2016 | Ebrahimi | |
| 2017/0005804 A1 | 1/2017 | Zinder | |
| 2017/0116615 A1 | 4/2017 | Burgess et al. | |
| 2017/0357980 A1* | 12/2017 | Bakun | G06Q 20/027 |
| 2018/0108020 A1* | 4/2018 | Thatte | H04L 9/0866 |
| 2018/0309581 A1* | 10/2018 | Butler | H04L 63/0861 |
| 2018/0341648 A1* | 11/2018 | Kakavand | G06F 16/1873 |
| 2019/0057382 A1* | 2/2019 | Wright | H04L 9/3242 |
| 2019/0386834 A1* | 12/2019 | Furukawa | G06Q 20/389 |

OTHER PUBLICATIONS

Phillip Griffin, Signcryption Information Assets, Jun. 2012, ISSA Journal (Year: 2012).*

Accredited Standards Committee X9, Incorporated, ANSI X9.84-2010, Biometric Information Management and Security for the Financial Services Industry, American National Standards Institute, Mar. 31, 2010, 172 pages.

American National Standard for Financial Services, "Cryptographic Message Syntax ASN.1 and XML", Ansi X9.73-2010, Apr. 15, 2010. 89 pages.

American National Standard for Financial Services, Trusted Time Stamp Management and Security, ANSI X9.95-2011. 150 pages.

BSI Standards Publication, Information Technology—Security Techniques—Signcryption, BS ISO/IEC 29150:2011. 64 pages.

Griffin, P., Biometric Knowledge Extraction for Multi-Factor Authentication and Key Exchange, Procedia Computer Sciences, vol. 61, Complex Adaptive Systems, Nov. 2-4, 2015, 6 pages.

Griffin, P., Telebiometric Authentication Objects, Procedia Computer Science, vol. 36, Complex Adaptive Systems, Philadephia, PA, Nov. 3-5, 2014, 8 pages.

Griffin, Phillip, "Protecting Biometrics Using Signcryption", ID306: The Global Forum on Identity, Apr. 23-24, 2012, The Center for Identity—University of Texas at Austin. 8 pages.

Griffin, Phillip, Signcryption for Biometric Security, Journal of Cyber Security and Information Systems, 1-1, Oct. 2012, p. 6-9 (Year: 2012).

Griffin, Phillip, Signcryption Information Assets, ISSA Journal, Jun. 2012, p. 33-37 (Year: 2012).

International Telecommunication Union, Password-authenticated key exchange (PAK) protocol, Series X: Data Networks, Open System Communications and Security, ITU-T Recommendation X.1035, Feb. 2007, 12 pages.

International Telecommunication Union, Series X: Data Networks, Open System Communications and Security Directory, ITU-T, X.509, Oct. 2012. 208 pages.

Phillip Griffin, Signcryption Information Assets, ISSA Journal, Jun. 2012 (Year: 2012).

* cited by examiner

BIOMETRICS-BASED E-SIGNATURES FOR PRE-AUTHORIZATION AND ACCEPTANCE TRANSFER

CROSS-REFERENCE TO RELATED APPLICATIONS

This application is a divisional of U.S. patent application Ser. No. 15/967,311, titled "BIOMETRICS-BASED E-SIGNATURES FOR PRE-AUTHORIZATION AND ACCEPTANCE TRANSFER," filed on Apr. 30, 2018, which itself claims the benefit of priority from U.S. Provisional Application No. 62/492,679, titled "BIOMETRICS-BASED E-SIGNATURES FOR PRE-AUTHORIZATION AND ACCEPTANCE TRANSFER," filed on May 1, 2017, both of which are incorporated herein by reference in their entireties and for all purposes. This application also incorporates by reference, in their entireties for all purposes, the contents of U.S. Provisional Patent Application No. 62/439,587, entitled "BIOMETRIC ELECTRONIC SIGNATURE AUTHENTICATED KEY EXCHANGE TOKEN," filed on Dec. 28, 2016, U.S. Pat. No. 11,070,378, entitled "SIGNCRYPTED BIOMETRIC ELECTRONIC SIGNATURE TOKENS," filed on Nov. 7, 2016, and U.S. Pat. No. 10,277,400, entitled "BIOMETRIC ELECTRONIC SIGNATURE TOKENS," filed Oct. 20, 2016.

BACKGROUND

As computer-based technologies have evolved, conventional in-person and paper-based transactions and communications are increasingly performed electronically over networks (e.g., the internet). Although electronic communications have significantly reduced costs and improved efficiencies, they pose significant risks regarding identification and authentication of signing parties, integrity of data, and confidentiality.

An electronic signature ("e-signature") refers to data in electronic form that is associated with a record and that is used by a signatory or signing party to sign the record. An e-signature is intended to provide a secure and accurate identification method for the signatory to provide a seamless transaction to a relying party. Definitions of e-signatures vary depending on the applicable jurisdiction. For example, the United States is governed under the Electronic Signatures in Global and National Commerce Act ("ESIGN") and the Government Paperwork Elimination Act ("GPEA"). Under the ESIGN an e-signature is defined as an electronic sound, symbol, or process, attached to or logically associated with an agreement or other record and executed or adopted by a person with the intent to sign the record. Additionally under United States federal law, the GPEA further defines the term "electronic signature" to mean a method of signing an electronic message that: (A) identifies and authenticates a particular person as the source of the electronic message; and (B) indicates such person's approval of the information contained in the electronic message. Increasingly, digital signatures are used in e-commerce and in regulatory filings to implement electronic signature in a cryptographically protected way.

Digital signatures are mathematical schemes for demonstrating the data integrity and origin authenticity of digital messages or electronic documents. A variety of cryptographic techniques are used to create digital signatures, for example, public key cryptographic systems (e.g., asymmetric key cryptographic systems). With public-key cryptographic systems, two types of keys are used-public keys and private keys. A recipient of a message that has been digitally signed can use the digital signature to verify the identity of the message sender and to confirm that the message has not been altered during transit. In a typical digital signature arrangement, a sender uses a cryptographic hash function to produce a message digest. The message digest is much smaller than the original message but is still relatively unique to the message. The sender then uses its private key to generate the digital signature using the message digest. The process of signing the message uses a mathematical operation that can only be performed by the sender who possesses the private key. The message and the "digital signature" can then be sent to a recipient. As will be appreciated, the recipient (e.g., the relying party) is an entity that can use the digital signature and the message sender's public key (e.g., encapsulated in a certificate) to determine that the sender is the message signer and that the integrity and origin authenticity of the message has not been compromised.

Biometrics can be used for human identification and verification for physical and logical access. Physical access can include admittance to buildings, rooms, or secure locations. Logical access can include logging in to applications or services or enabling entitlements. Authentication systems require that the party that wishes to be authenticated has enrolled a biometric reference template at a biometric service provider ("BSP") or similar entity. A biometric reference template is a digital reference of an individual's distinct characteristics obtained by processing one or more biometric samples from the individual. Biometric traits may include, for example, biological (e.g., fingerprint, iris, hand geometry, etc.) and behavioral (e.g., gait, gesture, keystroke dynamics, etc.) characteristics that reliably distinguish one person from another. Digital representations of these characteristics are stored in an electronic medium as a reference template, and later used to authenticate the identity of an individual who provides a subsequent biometric sample.

Today, information is more likely to be accessed by individuals from a cloud-based system using mobile and wireless devices. These devices may be personally owned, outside of the administrative control of an organization, and immune to its security and privacy policies. If these devices are lost or stolen, it may not be possible for an organization to erase the business critical information they might contain, such as customer and supplier contacts, bid and proposal data, or intellectual property. These factors all increase risk to the organization and its business-critical and sensitive information. While greater mobility and access to information from anywhere are benefits of using personally-owned mobile devices, there is a growing concern and need for data protection as organizations rely on public networks to exchange and access sensitive information, for example, biometrics. As transactions, interactions, and communications occur over various internet-centric services, the protection of personally identifiable information ("PII") needs to be efficient and effective, providing assurance of the identity of the party while not compromising any sensitive information or slowing down information exchange processes with heavy (e.g., processor-intensive) protection mechanisms.

SUMMARY

Various embodiments relate to a method that includes receiving an agreement associated with a signing party by a computing system, receiving a biometric sample captured from the signing party by the computing system, generating a hash of the agreement by the computing system, and receiving a secret knowledge factor by the computing system. The method further includes generating an encryption key using the secret knowledge factor as an input to a password authenticated key exchange protocol by the computing system. The method further includes generating a biometric-based electronic signature token by encrypting the biometric sample and the hash of the agreement with the encryption key by the computing system. The biometric-based electronic signature token having the encrypted biometric sample and the hash of the agreement and a signing party identifier associated with the secret knowledge factor. The biometric-based electronic signature token can be verified using a decryption key generated using a stored knowledge factor as an input to the password authenticated key exchange protocol. The stored knowledge factor is retrieved based on the signing party identifier. Identity of the signing party can be authenticated by decrypting the encrypted biometric sample from the biometric-based electronic signature token using the decryption key, and matching the decrypted biometric sample with a biometric reference template associated with the signing party identifier. The method further includes generating a smart contract based on the agreement by the computing system. The smart contract includes terms of the agreement and the biometric-based electronic signature token. The biometric-based electronic signature token providing biometric-based pre-authorization by the signing party of a payment to be initiated by the smart contract in response to detecting performance of at least one of the terms of the agreement.

Various embodiments relate to a system for carrying out a value transfer. The system includes one or more processors and one or more non-transitory machine readable media with instructions stored thereon. The instructions, when executed by the one or more processors, cause the system to receive an agreement associated with a signing party, receive a biometric sample captured from the signing party, generate a hash of the agreement, receive a secret knowledge factor, and generate an encryption key using the secret knowledge factor as an input to a password authenticated key exchange protocol. The instructions further cause the system to generate a biometric-based electronic signature token by encrypting the biometric sample and the hash of the agreement with the encryption key. The biometric-based electronic signature token having the encrypted biometric sample and the hash of the agreement and a signing party identifier associated with the secret knowledge factor. The biometric-based electronic signature token can be verified using a decryption key generated using a stored knowledge factor as an input to the password authenticated key exchange protocol. The stored knowledge factor is retrieved based on the signing party identifier. Identity of the signing party can be authenticated by decrypting the encrypted biometric sample from the biometric-based electronic signature token using the decryption key, and matching the decrypted biometric sample with a biometric reference template associated with the signing party identifier. The instructions further cause the system to generate a smart contract based on the agreement. The smart contract includes terms of the agreement and the biometric-based electronic signature token. The biometric-based electronic signature token providing biometric-based pre-authorization by the signing party of a payment to be initiated by the smart contract in response to detecting performance of at least one of the terms of the agreement.

Various embodiments relate to one or more non-transitory computer readable media having computer-executable instructions embodied therein that, when executed by one or more computing systems, cause the one or more computing systems to perform operations. The operations include receiving an agreement associated with a signing party, receiving a biometric sample captured from the signing party, generating a hash of the agreement, receiving a secret knowledge factor, and generating an encryption key using the secret knowledge factor as an input to a password authenticated key exchange protocol. The operations further include generating a biometric-based electronic signature token by encrypting the biometric sample and the hash of the agreement with the encryption key. The biometric-based electronic signature token includes the encrypted biometric sample and the hash of the agreement and a signing party identifier associated with the secret knowledge factor. The biometric-based electronic signature token can be verified using a decryption key generated using a stored knowledge factor as an input to the password authenticated key exchange protocol. The stored knowledge factor is retrieved based on the signing party identifier. Identity of the signing party can be authenticated by decrypting the encrypted biometric sample from the biometric-based electronic signature token using the decryption key, and matching the decrypted biometric sample with a biometric reference template associated with the signing party identifier. The operations further include generating a smart contract based on the agreement. The smart contract includes terms of the agreement and the biometric-based electronic signature token. The biometric-based electronic signature token providing biometric-based pre-authorization by the signing party of a payment to be initiated by the smart contract in response to detecting performance of at least one of the terms of the agreement.

These and other features, together with the organization and manner of operation thereof, will become apparent from the following detailed description when taken in conjunction with the accompanying drawings, wherein like elements have like numerals throughout the several drawings described below.

Figure 1:
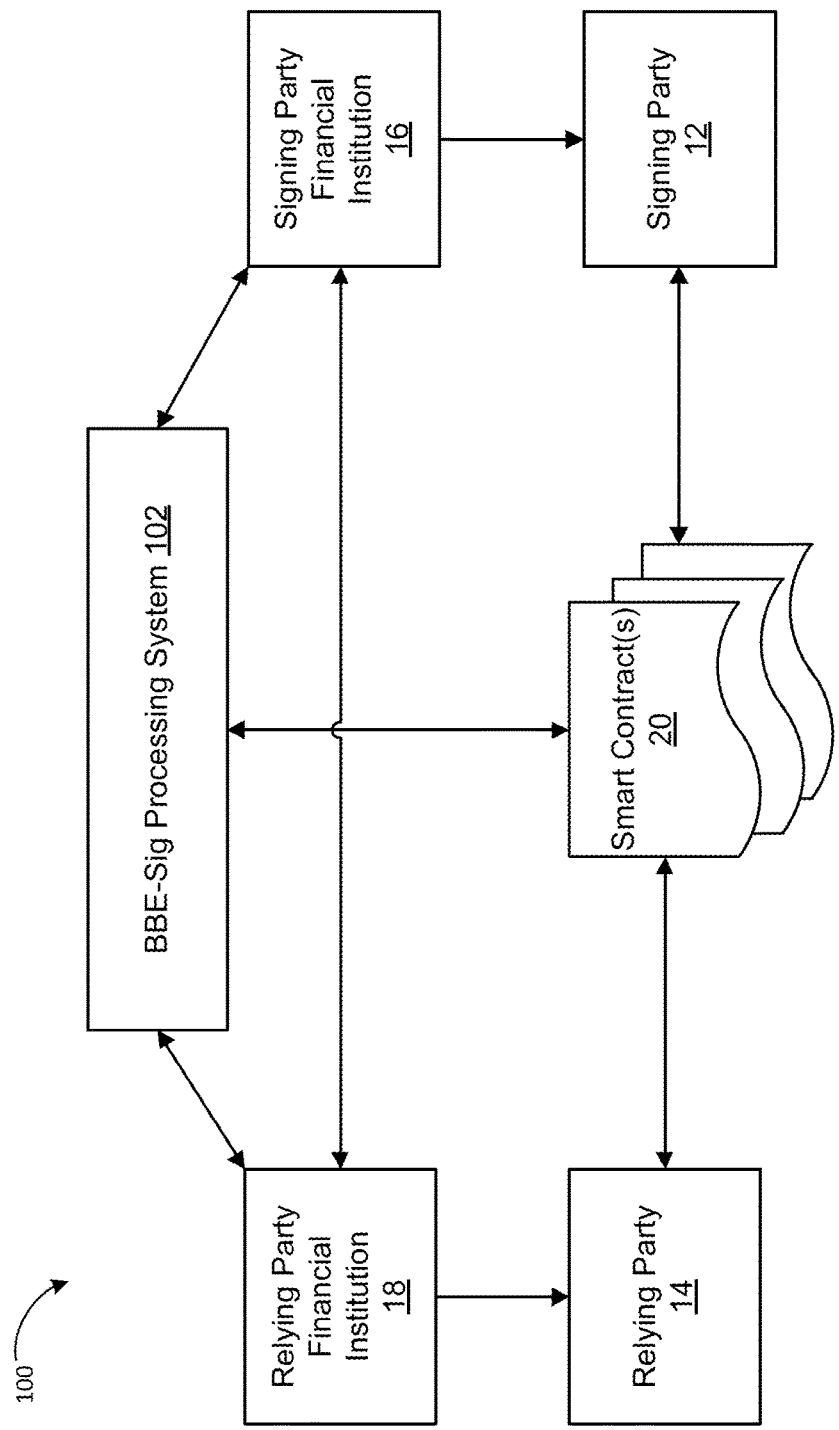
FIG. 1 is a block diagram illustrating of a biometrics-based electronic signature ("BBE-Sig") preauthorization and acceptance transfer system, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

There is an increasing need for organizations and individuals to securely protect the confidentiality, integrity, and authenticity of their information assets. Consequently, there is an even greater need for security if biometrics or other signing party (e.g., signing party, message signer, user, consumer, etc.) PII are provided in a message or interaction, either as a verification of the identity of the sender, as content within the message, or both. On an individual basis, there is a need to protect and secure a biometric sample while maintaining the authenticity and integrity of that sample. On a database level, where a database contains a plurality of biometric samples for a plurality of subscribers, the database must maintain origin authenticity and integrity for these samples. If not properly secured, databases are susceptible to "Hill-Climbing Attacks," where an unauthorized third-party randomly grabs binary bits in an attempt to generate a match to a biometric sample within the database. Consequently, there is a need for an authentication-based system for internet-centric interactions that provides greater assurance to the protection of identity as well as the veracity of the claimed identity while maintaining the speed, convenience, and efficiency of internet-centric transactions.

A distributed ledger (e.g. it should be understood that the term 'distributed ledger' is intended to include any type of distributed ledger, shared ledger, or blockchain) can enable smart contracts. A smart contract includes built-in conditions that, if satisfied, allow a predetermined transaction or action to take place. Examples of such conditions include, but are not limited to, approvals by a party to transactions, approvals by a third party (e.g., a government agency, and/or the like), performing an act or transaction, and the like. Examples of performing an act or transaction include, but are not limited to, paying a predetermined transaction amount, shipping goods, performing a service, and/or the like. Once a block or external event (monitored by the smart contract or blockchain system (indicating satisfaction of one or more conditions has been appended to the distributed ledger, the smart contract can allow a transaction to take place. Illustrating with a non-limiting example, once a first block indicating that approval is granted by a government agency is appended to the distributed ledger, the smart contract configured for the distributed ledger automatically triggers payment from a first party to a second party to complete a transaction. A second block containing information about the payment is appended to the distributed ledger. Responsive to reading the first block or responsive to reading the second block, the second party automatically ships goods to the first party. A third block containing information about the shipping is appended to the distributed ledger can be automatically determined (e.g., using the smart contract features of the distributed ledger) using the smart contract features of the distributed ledger.

A BEST is generated by cryptographically binding a tokenized biometric sample of a user (e.g., message signer) to a record, allowing the user (signing party) to associate his/her biometric information with the record. The cryptographic binding is performed via a digital signature associated with a public key certificate of the user. The BEST is a digitally signed record or signed hash of the record and the signing party's tokenized biometric sample that is protected under a digital signature and tied to an identity certificate. The BEST can subsequently be used to provide two-factor authentication via a "something-you-have" factor in the form of the user's private key, and a "something-you-are" factor in the form of the user's biometric sample. The BEST processing system allows a relying party to validate the information and authenticate the identity of the signing party at a later time, either through verification of a known identity or identification of a matching reference template and user identity. Through the signer certificate, extensions, and information contained in the BEST, a relying party may have all information needed to verify the digital signature and tokenized biometric information of the signing party.

An SBEST provides a signcrypting party (e.g., signing or signcrypting party) with the ability to provide a biometric sample from the signcrypting party and a record, both cryptographically bound (e.g. protected) under a digital signature, thereby providing assurance of the identity of the message (e.g., record) signer to a relying party through signcryption. An SBEST makes use of signcryption to produce a ciphertext (e.g., data that has been transformed by a cryptographic operation to hide its information content) that includes the digital signature and encryption process being combined into a single cryptographic operation. The signcryption algorithm takes as input a plaintext (e.g., a signcrypting party's biometric sample, a record, or other content), a signcrypting party's public and private key pair, a message recipient's public key and any other content or data, performs a sequence of specified operations on the input and outputs ciphertext. Occurring simultaneously with encryption is the digital signature process. Digital signature refers to the process that takes as inputs the message, one or more signature keys, and the domain parameters, and outputs a signature. The resulting output ciphertext of the simultaneous digital signing and encryption is used in a message. An SBEST is the resulting message in the form of a token, such that the SBEST includes elements of content (e.g., biometric, record, symbolic value, etc.) and other implementation specific data (which can be attached as signed attributes). An SBEST is structured such that no information about the original data can be recovered (except possibly its length). The resulting SBEST is such that it cannot be used to generate a new ciphertext by an unauthorized entity without detection from a relying party. The signcrypting party may send an SBEST, for example, in the form of a SigncryptedData message, to a relying party.

A BESAKE token makes use of authenticated encryption to produce a ciphertext (e.g., data that has been transformed by a cryptographic operation to hide its information content). To generate the BESAKE token, the signing party provides a record (e.g., document), a biometric sample, a secret knowledge factor, and a signing party identifier. The secret knowledge factor may be extracted by the BESAKE processing system from the provided biometric sample. In some arrangements, the signing party may provide the secret knowledge factor by entering the secret knowledge factor into a field on a computing device. Subsequently, the BESAKE token may be utilized to authenticate a signing party to facilitate secure, encrypted transactions with the relying party (for example, a financial institution) by extracting knowledge data from the biometric sample provided by the signing party in addition to the biometric matching, thereby accomplishing multi-factor authentication.

Various embodiments described herein relate to systems and methods for a BBE-Sig preauthorization and acceptance transfer system in connection with e-commerce transactions or other types of signing events, such as those involving cloud-based, blockchain-based, distributed ledgers, or smart agreement systems, for example. The BBE-Sig preauthorization and acceptance transfer system is structured to generate a biometrics-based signature (utilizing the BEST, SBEST, and BESAKE tokens described in the referenced applications, and summarized in brief below) containing an agreement between a signing party and a relying party. The BBE-Sig token provides a signing party (e.g., consumer or signing party) with the ability to provide a biometric sample from the signing party and an agreement, both cryptographically bound (e.g. protected) under a digital signature, thereby providing assurance of the identity of the message (e.g., record) signer to a relying party through a signature method (e.g., signcryption, public/private key pair, authenticated key exchange, etc.).

As a form of pre-authorization, the BBE-Sig token is placed into a smart contract (e.g., remote procedure call) that monitors the terms and performance of the agreement and the BBE-Sig token is provided to the relying party as acceptance transfer if the agreement is met. In some arrangements, the BBE-Sig token is wrapped in executable code, or within reach of, or access by some code. When the agreement conditions are met, the BBE-Sig is transmitted to someone, some entity, or some location. Further, the BBE-Sig token preauthorization and acceptance transfer system can generate one or more smart contracts associated with the service or good to be provided to the signing party by the supplier. In other arrangements, the BBE-Sig token is not generated until the agreement conditions are met. A signing party may provide their biometric sample attached to a record along with an ACCEPT indicator and, once the agreement is met, the agreement and biometric sample are signed, generating the BBE-Sig token. In both arrangements, the BBE-Sig token can be stored and subsequently retrieved on a distributed ledger or blockchain, or the BBE-Sig token may be transmitted to an entity to complete the agreement. The smart contracts may be used to establish which service or good will be provided to the signing party and what price the signing party will pay for access to the good or service. In some embodiments, the BBE-Sig token preauthorization and acceptance transfer system can configure the smart contracts such that payments are made in real time in response to detection of performance of the terms of the smart contract. As will be readily apparent, the agreement to enter into a smart contract is tied to a "signature" in the form of a biometric of one or all parties to the agreements, thus having a stronger assurance toward the identity of the parties in the agreement.

One unresolved question regarding smart contracts is whether or not they are legally enforceable. Under common law, formation of a contract generally requires an offer, acceptance, consideration, and a mutual intent to be bound by the contract. Smart contracts, as they exist today, are not legal contracts, but rather are simply a mechanism for enforcing a contract. At best, acceptance and intent are presumed via digital signatures. However, digital signatures can be compromised if a fraudster obtains access to a signer's private key. In contrast, a BBE-Sig token cryptographically binds a biometric sample from the signing party to the smart contract to provide non-reputable evidence that the signing party pre-authorizes execution of the smart contract in the form of the bound biometric sample. Because biometric samples uniquely identify an individual, it is not possible for a fraudster to forge a signature. Thus, the BBE-Sig token provides a stronger indication of acceptance and intent of a smart contract by a particular signing party than that which is available with existing systems.

In any of the embodiments of the BBE-Sig token (e.g., BEST, SBEST, and BESAKE token) a relying party can verify the BBE-Sig token to provide a "something-you-have" identification factor and can authenticate the identity of the user (e.g., signing party) via the biometric sample to provide a "something-you-are" authentication factor. In some embodiments, the "something-you-are" identification is achieved by performing a path validation on the signer certificate chain back to a trust anchor. In some embodiments, the "something-you-are" identification factor is achieved through a biometric authentication processes including verification or identification. Verification is the process of comparing a biometric match template against a specific biometric reference template based on a claimed identity (e.g., user ID, account number, etc.). Identification is the process of comparing a submitted biometric sample against some or all enrolled reference templates to determine an individual's identity. In some arrangements, the BBE-Sig preauthorization and acceptance transfer system may require that a user first enrolls in a biometric system to generate a biometric reference template that can be used for subsequent biometric matching to verify the user's identity via a biometric sample acquired from the user. In other arrangements, the BBE-Sig preauthorization and acceptance transfer system may generate a biometric reference template from the user-provided biometric sample so that the user can be enrolled in a biometric system for subsequent biometric authentication or identification.

According to various embodiments, the BBE-Sig preauthorization and acceptance transfer system utilizes signcryption (e.g., akin to the SBEST) to generate a BBE-Sig token. In these embodiments, the BBE-Sig token makes use of signcryption to produce a ciphertext (e.g., data that has been transformed by a cryptographic operation to hide its information content) that includes the digital signature and encryption process being combined into a single cryptographic operation. The signcryption algorithm takes as input a plaintext (e.g., a signing party's biometric sample, a record, or other content), a signing party's public and private key pair, a relying party's public key and any other content or data, performs a sequence of specified operations on the input and outputs ciphertext. Occurring simultaneously with encryption is the digital signature process. Digital signature refers to the process that takes as inputs the message, one or more signature keys, and the domain parameters, and outputs a signature. The resulting output ciphertext of the simultaneous digital signing and encryption is used in a message. A BBE-Sig token is the resulting message in the form of a token, such that the BBE-Sig token includes elements of content (e.g., biometric, record, symbolic value, etc.) and other implementation specific data (which can be attached as signed attributes). A BBE-Sig token is structured such that no information about the original data can be recovered (except possibly its length). The resulting BBE-Sig token is such that it cannot be used to generate a new ciphertext by an unauthorized entity without detection from a relying party. The signing party may send an BBE-Sig token, for example, in the form of a SigncryptedData message, to a relying party.

A relying party can decrypt a signcrypted BBE-Sig token to access the simultaneously digitally signed and encrypted (e.g., signcrypted) biometric sample and record by using an unsigncryption algorithm associated with the BBE-Sig token. The unsigncryption algorithm includes as input the BBE-Sig token, a recipient's public and private key pair, a sender's public key and any other data. In some arrangements, the resulting output includes a pair consisting of either a symbolic value "ACCEPT" and a plaintext (e.g., record and biometric sample), or a symbolic value "REJECT" and a null string. When there are any signed attributes, the recipient may also verify the digital signature. Once decrypted, a BBE-Sig token provides a relying party with all information needed to verify the digital signature and biometric information of the signing party.

In some embodiments, the BBE-Sig token is generated using a signcryption-attributes mode, which allows content of any type or format to be signcrypted together with any number of attributes of any type or format. With the signcryption, there is a value of a type for attributes that are to be signcrypted with the content and placed in the signature component (e.g., digital signature) of the BBE-Sig token. In other words, the signcryption-attributes mode can contain an optional attributes component type that is not included in the signcrypted message and are therefore unencrypted. Beneficially, this allows the BBE-Sig token to provide information in the attribute field that is "viewable" by entities that do not have the capabilities of designcrypting the signcrypted BBE-Sig token. For example, the attributes field may include information related to the terms of the agreement, allowing third parties to monitor the performance of at least one of the terms of the agreement. The signcryption process for the signcryption-attributes mode is similar to the regular signcryption process; the signing party signcrypts each of the hash of the agreement and biometric sample (e.g., content) using the public and private keys of the sender and the public key of the recipient and an attributes value is included in the attributes (or related) field that is not included in the message. In other words, the signcryption-attributes mode results in concatenating the attributes to the content signcrypted by the signing party.

Turning to another embodiment of the BBE-Sig token, the BBE-Sig preauthorization and acceptance transfer system utilizes secret knowledge data and a password authenticated key exchange ("PAKE") protocol (e.g., akin to the BESAKE) to generate a BBE-Sig token. According to those embodiments, a signing party provides a biometric sample for authentication. The biometric sample contains, and is parsed into, secret knowledge data, such as a "something-you-know" weak secret (e.g., a password), and biometric matching data, such as a "something-you-are" strong secret (e.g., a voice profile, fingerprint, etc.). A symmetric key is created using the extracted secret knowledge data (e.g., using a PAKE protocol). The symmetric key is used to encrypt the biometric matching data and record to generate a BBE-Sig token. Some embodiments utilize a key agreement scheme, such as Diffie-Hellman ("D-H"), to create the symmetric encryption key. This key protects the confidentiality of signing party credentials and other message data transferred during operation of the BBE-Sig token. BBE-Sig token and a signing party identifier associated with the signing party are then transmitted to an authentication system.

To verify the BBE-Sig token generated using the secret knowledge data, the relying party may request to match the signing party identifier to a stored knowledge factor and generate a decryption key based on the stored knowledge factor. In some embodiments, the stored knowledge factor is established (e.g., provided by the signing party or assigned to the signing party by the authentication system) when the signing party establishes an account with the authentication system. The stored knowledge factor may also be changed periodically by the signing party. The decryption key may be used to decrypt the BBE-Sig token and retrieve the biometric matching data and record. The secret knowledge data (e.g. signing party secret) may be extracted from the biometric matching data. The signing party is authenticated with a single authentication factor if the secret knowledge data extracted from the biometric matching data matches the stored knowledge factor. The biometric matching data may also be matched with a biometric reference template associated with the signing party to authenticate the signing party with a second authentication factor. In this regard, the "something-you-are" identification factor is achieved through a biometric authentication process including verification or identification. Through the use of the PAKE protocol, users (e.g., signing parties) never reveal their knowledge or biometric credentials to imposter recipients or man-in-the-middle observers as D-H key agreement allows two parties to establish a cryptographic key without ever actually exchanging the private value.

Turning to another embodiment of the BBE-Sig token, the BBE-Sig preauthorization and acceptance transfer system utilizes tokenization (e.g., akin to the BEST) to generate a BBE-Sig token. The agreement is hashed and cryptographically bound to a tokenized biometric sample of a signing party, The cryptographic binding is performed via a digital signature associated with a public key certificate of the user that is protected under a digital signature and tied to an identity certificate. This BBE-Sig token can subsequently be used to provide two-factor authentication via a "something-you-have" factor in the form of the user's private key, and a "something-you-are" factor in the form of the user's biometric sample. Through the signer certificate, extensions, and information contained in the BBE-Sig token, a relying party may have all information needed to verify the digital signature and tokenized biometric information of the signing party.

In some arrangements, the digital signature of a BBE-Sig token is completed using the Abstract Syntax Notation One ("ASN.1") type "SignedData." In those arrangements, a cryptographic hash is used to create the BBE-Sig token on the content-to-be-signed and any associated attributes carried in type SignedData. The hash is calculated using the hash algorithm and parameters specified by the signer, the content-to-be-signed, and any attributes the signer wants to authenticate and cryptographically bind to the content. In some arrangements the agreement is included in "attributes" of the SignedData message. For example, both a Security Assertion Markup Language ("SAML") assertion and the TST could be included in the SignedData UnsignedAttributes field, as well as being cryptographically bound to the content. Additionally, any SignedData content-to-be-signed (e.g., tokenized biometric reference template, agreement, etc.) can be "detached." The detached content is such that the signature in the SignedData message is performed over the content-to-be-signed, but that signed content is not included in the SignedData message, thereby being detached. However, the content-to-be-signed must be available when the SignedData signature is verified, since the signature verification process requires computing the hash over the content-to-be-signed. For example, when a biometric reference template is signed, applications can convey the template content separately from any signed attributes associated with the template. This allows an application process to operate on the biometric template (e.g., during the matching process) while ignoring associated information security management attributes, and to rely on another application process (e.g., a Web service to perform signature verification). In some arrangements utilizing the SignedData message, the BEST processing system can generate an information object of class "attribute" to provide additional information in the SignedData message, for example, a customer number, financial institution, account, request information for a BSP or token service provider ("TSP"), and other information the signing party would like to include with the record in the BBE-Sig token.

This embodiment of the BBE-Sig token provides the relying party with all information needed to verify the digital signature and tokenized biometric information of a signing party. Path validation is performed on the signer certificate chain back to a trust to determine whether a received BBE-Sig token is trusted (e.g., that the signature itself is valid and that the certificates in the path are not on a revocation list). The recipient can apply the same hash function to the received BBE-Sig token to produce a message digest. Using the public key of the sender, the recipient can attempt to verify the signed version of the message digest that the recipient has received from the sender. The verification procedure uses the sender's public key in a mathematical operation to determine whether the signature was indeed created from the same message digest using the correct private key. If the verification function is successful, the signed version of the message digest will be proven to originate from the message digest that the recipient has produced by applying the hash function directly to the message. A relying party can achieve an identification authentication factor by requesting for the tokenized biometric sample to be detokenized by a TSP. After providing the proper credentials and receiving the detokenized biometric sample, the relying party can request a biometric service provider ("BSP") to authenticate the detokenized biometric sample. Biometric authentication processes include verification and/or identification.

The BBE-Sig preauthorization and acceptance transfer system provides technical solutions to computer-centric and internet-centric problems associated with conventional authentication systems. First, the BBE-Sig preauthorization and acceptance transfer system achieves data confidentiality and origin authenticity simultaneously by combining public-key encryption and digital signatures and offers better overall performance and security over sign-then-encrypt schemes. SBESTs provide shorter ciphertext and/or lower computational cost, making it ideal for protecting biometrics in environments with bandwidth limitations (e.g., wireless mobile devices), high volumes of transactions (e.g., Internet commerce), or size or cost of storage issues (e.g., smart cards). SBEST is a form of asymmetric cryptography that makes use of convenient symmetric techniques to remove some of the problems (e.g., trying to process long messages quickly) inherent in traditional asymmetric cryptosystems. Specifically, SBEST requires only a single key pair for each communicating party, while traditional sign-then-encrypt schemes (e.g., as defined in the X9.84 biometric information security management standard) require two key pairs for each communicating party. With this approach, message processing performance is improved, there are fewer keys to manage, and the need to establish a shared secret with a relying party is eliminated. In addition, SBEST can provide non-repudiation services, which is not possible in current systems.

SBEST also provides the high-level cryptographic key protection required to support various biometric matching operations, such as those of the United States Department of Defense ("DoD") Defense Forensics and Biometrics Agency (DFBA), while meeting the performance demands of biometric collection devices in the mobile environment. Through SBEST, the Elliptic Curve Pintsov-Vanstone Signature Scheme can be implemented, to provide security for bandwidth/computational resource limited Regular Ground Nodes. Additionally, SBEST is capable of providing sufficient security for a variety of security tiers while preventing the network from being overloaded due to the unnecessary cryptographic operations.

Further, the methods and systems described herein alleviate the strain on processing power and memory components currently required to manage, store, and authenticate the biometric sample of a message signer. The BBE-Sig preauthorization and acceptance transfer system provides a way for secure applications in a single cryptographic function to integrate encryption and signature schemes in an efficient way without sacrificing each scheme's security. Accordingly, the coupling of the signing party's biometric sample with the signing party's public-private key pair makes unauthorized replay (e.g., impersonation) of the signing party's biometric sample incredibly difficult, as a unauthorized party would need both a biometric sample from the signing party and the signing party's private key. In some embodiments, the BBE-Sig preauthorization and acceptance transfer system utilizes a signed attributes feature to provide for an easy and lightweight mechanism to bind additional information to biometric sample and content. The BBE-Sig preauthorization and acceptance transfer system's use of additional attributes avoids complicating certificate issuance and management of processes by allowing the signing party to add this information regarding certificate extension payload as a signed attribute. The ability to add attributes of any kind or any format makes SBEST a very flexible and adaptable electronic signature mechanism. Accordingly, an SBEST and the BBE-Sig preauthorization and acceptance transfer system can be easily adapted to support new business applications and security requirements. Additionally, making use of a TST from a TSA enables a relying party to determine when an SBEST was generated and that it is "fresh" (e.g., that the sample is not from an unauthorized party re-using a biometric sample). SBEST protects the confidentiality of the signing party's personally identifiable information and does not require the use of, or processing power to communicate and interact with, a tokenization service provider, either in-house or over a network.

These problems arise out of the use of computers and the Internet, because they involve processing power, bandwidth requirements, storage requirements, and information security, each of which is inherent to the use of computers and the Internet. The problems also arise out of the use of computers and the internet, because online communications, transactions, and payment services, and the ability to properly authenticate a signing party in an online communication, cannot exist without the use of computers and the Internet.

Referring to FIG. 1, a block diagram illustrating of a BBE-Sig preauthorization and acceptance transfer system 100 is shown, according to an example embodiment. The BBE-Sig preauthorization and acceptance transfer system 100 may include a signing party 12, a relying party 14, a signing party financial institution 16, a relying party financial institution 18, smart contract(s), and a BBE-Sig processing system 102. The signing party 12, relying party 14, signing party financial institution 16, and relying party financial institution 18 may include or include control over a computer system (e.g., one or more servers, each with one or more processing circuits), each including a processor and a memory.

The BBE-Sig processing system 102 is a centralized server connected to one or more of the other listed components within the BBE-Sig preauthorization and acceptance transfer system 100 via a network that is structured to facilitate agreements between the signing party (e.g., consumer, user, etc.) 12 and relying party (e.g., merchant, supplier, etc.) 14. Specifically, the BBE-Sig processing system 102 structured to generate and facilitate one or more smart contracts that include BBE-Sig tokens in response to parameters of an agreement between the signing party 12 and the relying party 14. The parameters vary by agreement instance, such as terms, amounts, dates, etc., and the executable would be initiated upon achievement of one or more of the parameters (as dictated by the legal agreement). Utilizing the BBE-Sig processing system 102, a BBE-Sig token may be wrapped in some executable code as part of a smart agreement and stored in a distributed ledger, blockchain, or similar storage location. Alternatively, a signing party 12 may provide their biometric sample attached to an agreement along with an ACCEPT indicator, with the BBE-Sig token is not generated until the agreement conditions are met. These components are wrapped in some executable code and stored in a distributed ledger, blockchain, or similar storage location.

The BBE-Sig processing system 102 has access to facilitate the withdrawal of funds from the signing party financial institution 16 if/when the agreement contained in the BBE-Sig token and smart contract 20 calls for it. For example, the agreement in the BBE-Sig token outlines that on the third of the month the signing party 12 agrees to pay 100 U.S.D. from an account at the signing party financial institution 16. In some arrangements, the account at the signing party financial institution 16 is stored in an attribute of the digital signature of the BBE-Sig token or as metadata in the smart contract 20. Once the third of the month is reached, the smart contract initiates the agreement in the BBE-Sig by transferring the funds from the account at the signing party financial institution 16.

By way of example, using the implementations described above, a signing party 12 wants to set up a recurring payment (bill, subscription service, mortgage, etc.) to a relying party 14. First, the signing party 12 and relying party 14 negotiate the terms of the recurring payment including conditions of the recurring payment (e.g., first of the month for the right to live in the premises for another month) and the amount of the recurring payment. The relying party 14 provides signing party 12 with the relying party financial institution 18 to receive the recurring payment. Once the terms are agreed to, the signing party generates the BBE-Sig token. The BBE-Sig token is generated by capturing a biometric sample of the signing party, hashing the agreement, and digitally signing the hash of the agreement and the biometric sample using the generation method similar to the BEST, SBEST, and BESAKE tokens discussed in the referenced applications and briefly summarized above. Additionally, the BBE-Sig token includes a reference to the agreement unhashed to allow for the agreement to be seen in plaintext. The unaltered agreement may be in the form as an attribute related to the signature method, as a Uniform Resource Identifier ("URI") or a pointer in the BBE-Sig token, or in the smart contract 20 itself. In some arrangements, the signing party 12 provides the components of the BBE-Sig token (e.g., the agreement, biometric sample, and desired digital signature mechanism) that are collected into a smart contract 20 and signed (e.g., the BBE-Sig token is generated) upon completion of agreement.

Continuing the example, the BBE-Sig processing system 102 places the BBE-Sig token (or components of the BBE-Sig token) into a smart contract 20. In some arrangements, the BBE-Sig processing system 102 is structured to generate and deploy smart contracts 20 on a distributed ledger or similar system. In some arrangements, the BBE-Sig token is wrapped in the smart contract 20. The smart contract 20 monitors for the terms and conditions of the agreement to occur. In some arrangements, conditions regarding the relying party 14 and signing party 12 related to the agreement are posted to a distributed ledger monitored by the smart contract 20. If the agreement's conditions are met when the smart contract 20 is executed, the preauthorized transfer of value occurs. If the agreement's conditions are not met when the smart contract 20 executes, there is no transfer of value. Instead, the smart contract 20 may issue a signal that contract conditions have not been satisfied. In some arrangements, two BBE-Sig tokens could be loaded in a smart contract 20 to be executed conditionally, one with an ACCEPT indicator if the agreement conditions are met and another with a DECLINE indicator if the agreement conditions are not met. By way of the example, on the $1^{st}$ day of each month, the smart agreement code is initiated such that the BBE-Sig token is sent off to the appropriate relying party 14 or, in some arrangements, compiled, signed/signcrypted and then sent off to the relying party 14. This process causes a transfer of value, as the funds from the signing party financial institution 16 are then transferred to the relying party financial institution 18, some account of the signing party to payment recipient's account.

Figure 2:
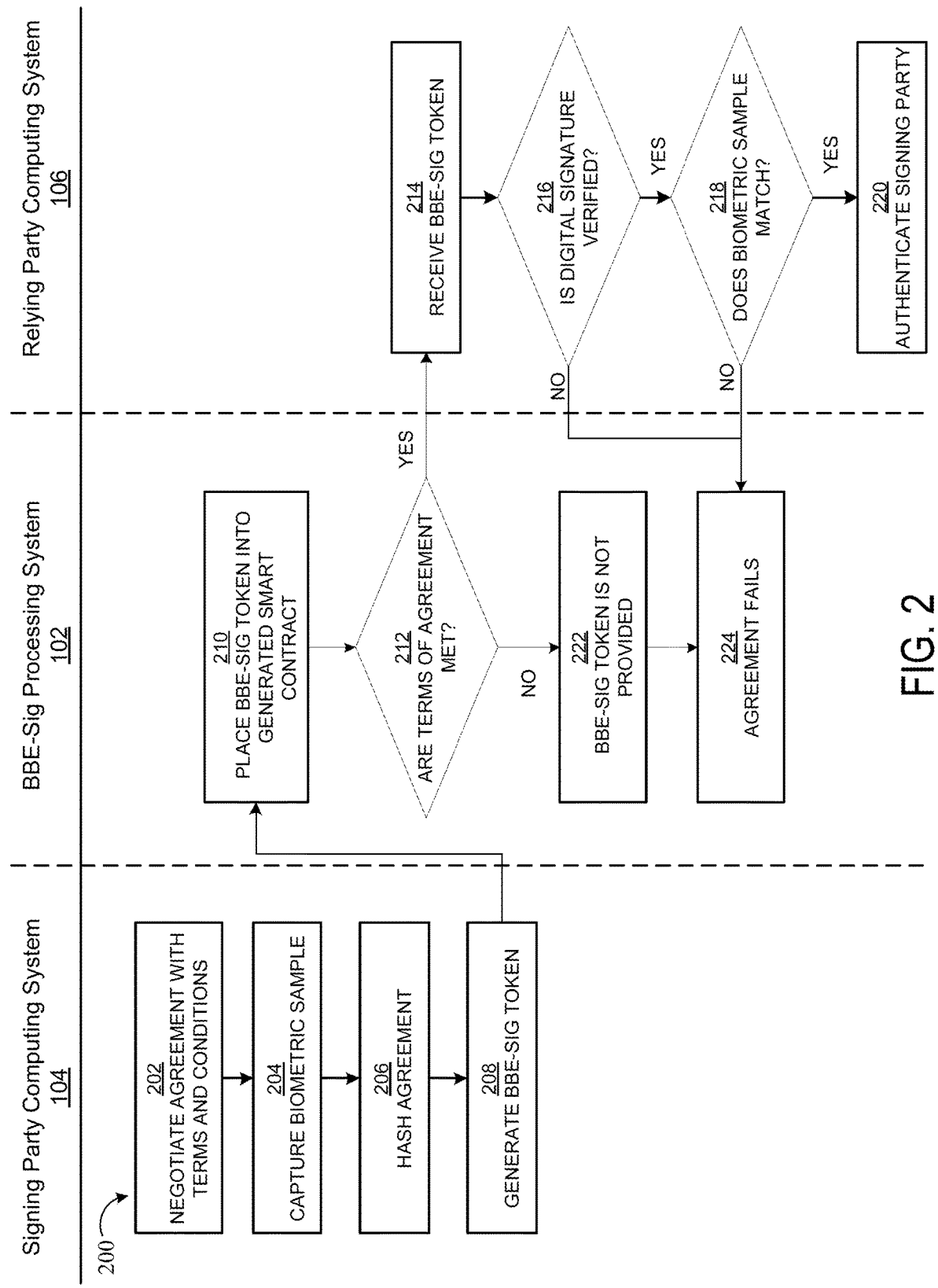
FIG. 2 is a flow diagram illustrating a method of generating and verifying a BBE-Sig token, according to an example embodiment.

Referring to FIG. 2, a flow diagram illustrating a method 200 of generating and verifying a BBE-Sig token is shown, according to an example embodiment. The method 200 is shown in connection to a signing party computing system 104, a BBE-Sig processing system 102, and a relying party computing system 106. The signing party computing system 104 may be operated by the signing party 12 of FIG. 1. The relying party computing system 106 may be operated by the relying party 14 of FIG. 1. The BBE-Sig processing system 102 may be the same BBE-Sig processing system of FIG. 1. The method 200 assumes that the signing party 12 enrolls a biometric reference template with a BSP. Enrollment is completed when the generated biometric reference template is associated with a signing party identifier unique to the signing party. Generally, the enrollment process includes the signing party providing a plurality of biometric samples. In some embodiments, the initial biometric sample is taken at the relying party's location using a biometric sensor. In other embodiments, the user must have their plurality of initial biometric samples taken at an establishment managed by a BSP.

The method 200 begins with basic terms and conditions being set by the signing party 12 and the relying party at 202. The relying party 14 and signing party 12 can choose to accept or reject the proposed terms and conditions. If the relying party 14 and signing party 12 accept the terms and conditions, then the agreement can be generated and executed. In some embodiments, a service provider controlling the BBE-Sig preauthorization and acceptance transfer system 100 may determine or need to approve terms and conditions to ensure that they meet the criteria set out by the service provider. In other embodiments, a service provider may be required to evaluate each potential agreement before a BBE-Sig token is to be generated. Further, other factors, such as available balance, fee agreements, or other terms and/or conditions, may be deemed unsatisfactory to the service provider based on information related to the relying party 14 and the signing party 12 and may result in termination or alteration of the agreement during negotiations. In some arrangements, there may be multiple signing parties, multiple relying parties, or a combination of both. Accordingly, there may be a plurality of terms and conditions, each with one or more party agreeing to perform under that term or condition.

The biometric sample of the signing party is captured by the signing party computing system 104 at 204. The biometric sample is captured using a biometric sensor or similar device (e.g., using a finger print scanner on a mobile computing device). In some arrangements, the biometric sample includes knowledge and matching factors. In other words, the secret knowledge factor is provided within the biometric sample. For example, the signing party's biometric sample could be a voice sample of the signing party speaking a biometric access phrase of "My password is password 123." In some arrangements, the captured biometric sample is first transmitted to a BSP to be processed into biometric data.

A hash of the agreement is generated by the signing party computing system 104 at 206. The hash allows for the data to be easily digitally signed and allows for repudiation when verified by the relying party 14. In some arrangements, a URI is included with the hash of the agreement. The URI would reference a location where the negotiated agreement would be stored. The URI would allow a relying party to use the decrypted URI to identify the agreement location, and the hash of the agreement would ensure that the agreement at the agreement location has not been altered (e.g., if the agreement at the agreement location is unaltered it will generate the same hash as found in the BBE-Sig token). Therefore, if the document at the URI were to change, even by one character, an authentication system would be able to detect that it's not the document the signing party intended to sign. In some arrangement, the biometric sample is tokenized as well. In some arrangements, the hash of the biometric sample (either tokenized or not) and the agreement is done during the digital signature process using a hash algorithm.

A BBE-Sig token is generated at 208. In some arrangements, the biometric sample and agreement are digitally signed and encrypted (e.g., signcrypted) to generate the BBE-Sig token. The process includes the use of a signcryption algorithm. The input for the signcryption algorithm of the BBE-Sig token includes: plaintext content (including at least the biometric sample and agreement), the signing party's public and private key pair, and the relying party's public key. In some arrangements, the input also includes a label and an option. The plaintext, label, and resulting BBE-Sig token are all bit strings, whereas the public and private keys and the option are determined by the particular implementation of a BBE-Sig token mechanism (e.g.,-content,-attributes, and components modes).

In other arrangements, the biometric sample and agreement are encrypted using a symmetric key. The symmetric key is created using the secret knowledge factor via an agreed-upon encryption algorithm (e.g., PAKE). The BBE-Sig token, including the encrypted biometric sample and agreement, is generated. The process includes the use of an encryption algorithm associated with the authenticated encryption mechanism. The input for the encryption algorithm of the BBE-Sig token includes plaintext content (including at least the biometric sample and agreement) and the secret knowledge factor (either manually entered, extracted from the biometric sample, or both). The plaintext content includes the biometric sample to provide the "something-you-are" authentication factor and the record to provide the transaction or interaction information. In some arrangements, additional attributes can be included in the input.

In other arrangements, the digital signature process includes generating a hash of the content-to-be-signed (e.g., agreement, tokenized biometric sample, or other content to be protected under the digital signature) using a hash algorithm. The signing party may identify other attributes or parameters, for example related to the parameters and terms of the agreement, to include in the resulting token and then the hash of the content-to-be-signed is signed with the signing party's private key of a public/private key pair. The resulting BBE-Sig token cryptographically binds the content-to-be-signed, thus providing the signing party with a signer identity authentication parameter (e.g., the biometric sample) and a certificate identity parameter (e.g., the public/private key pair) bound to the agreement.

At 210, the BBE-Sig processing system 102 places the BBE-Sig token into a smart contract 20. The smart contract 20 is generated to monitor and facilitate transactions in accordance with the negotiated agreement. In other words, the BBE-Sig processing system 102 utilizes smart contracts 20 in combination with constantly monitoring the performance of a service for the duration of an agreement. In some arrangements, the BBE-Sig token has attributes or similar extensions that provide information to the smart contract 20 to assist in monitoring and executing transactions in accordance with the negotiated terms and agreements. The BBE-Sig processing system 102 can generate one or more smart contracts 20 associated with the service or good being provided to the signing party by the relying party. The smart contracts 20 may be used to establish which service or good will be provided to the signing party and what price the signing party will pay for access to the good or service. In some arrangements, a single smart contract 20 may have multiple BBE-Sig tokens. For example, a smart contract 20 may be generated to monitor the progress of a home construction agreement, the smart contract 20 may have a BBE-Sig token between the homeowner and builder, a BBE-Sig token between the homeowner and realtor, and a BBE-Sig token between the builder and supplier. As will be appreciated, each BBE-Sig token and each agreement within a BBE-Sig token may have a different or unique digital signature.

At 212 the smart contract 20 containing the BBE-Sig token monitors the terms of the agreement to determine if they are met. In some arrangements, the monitoring may be a software application associated with a personal computing device of the relying party 14 or signing party 12, such as a smartphone. The monitoring can be of any good or service, for example, a software application may be used to monitor economy services, such as home rentals, professional services, or any other type of access service. In some embodiments, the monitoring may be one or more internet of things ("IoT") devices. For example, where the agreement is a home rental, a connect smart-lock may monitor when the signing party enters or leaves the property. Further, other IoT devices, such as connected sensors, cameras, thermostats, lights, appliances, and the like may be used to monitor the use of the supplied good or service in accordance with the conditions of the agreement. By way of another example, where the professional service is a counseling service (e.g., medical counseling, legal counseling, etc.), the monitoring may provide the interface between the relying party 14 and the signing party 12, such as by providing a video conference between the parties. In some arrangements, the BBE-Sig processing system 102 may provide status updates of the agreement in the smart contract to both the signing party 12 and the relying party 14. In some arrangements, the BBE-Sig processing system 102 is in constant communication with the signing party financial institution 16 or the relying party financial institution 18 to allow for real-time allocation of the financial hold of the funds in signing party sub-account or the relying party sub-account for the duration of the agreement. In some embodiments, allocating funds to the relying party financial institution 18 can include releasing a hold placed on the funds previously allocated to the relying party sub-account that is equal to the hold placed on the funds in the signing party sub-account. If the terms of the agreement are not met, the BBE-Sig token is not provided at 222 and the agreement fails at 224.

At 214, the relying party receives the BBE-Sig token. Depending on the implantation used to generate the BBE-Sig token at 208, the relying party can verify the digital signature a variety of ways at 216. In one arrangement, path validation is performed on the signer certificate chain back to a trust anchor. The relying party determines whether the message and signed message digest (the "digital signature") that was sent to the relying party is valid and trusted (e.g., that the signature itself is valid and that the certificates in the path are not on a revocation list). The relying party can apply the same hash function to the received message to produce a message digest. Using the public key of the signing party, the recipient can attempt to verify the signed version of the message digest that the recipient has received from the signing party. The verification procedure uses the signing party's public key in a mathematical operation to determine whether the signature was indeed created from the same message digest using the correct private key. If the verification function is successful, the signed version of the message digest will be proven to have originated from the message digest that the recipient has produced by applying the hash function directly to the message. A successful verification operation therefore allows the recipient to confirm the true authorship of the message and to confirm that the message has not been altered. In some arrangements, an SBEST includes PKI, CRLs, CA, or similar information for the relying party computing system 106 to track the signature back to a trust anchor/entity. For example, the relying party computing system 106 verifies with the public or private service provider associated with the key pair used that the public key certificate is valid. In other arrangements, the relying party computing system 106 may use the signing party's public key and the relying party's public and private key to verify the signature. If the digital signature is verified, the process continues to 218. If the digital signature is not verified, the agreement fails at 224.

At 218, the relying party computing system 106 transmits a biometric match request to a BSP and the BSP verifies the biometric sample. The verification is a "one-to-one" comparison that entails comparing a biometric match template generated from the transmitted/provided biometric sample and a previously generated reference template stored in a database of the BSP. Alternatively, the request, at 218, could be for an identification. Identification is the process of comparing a submitted biometric sample against some or all enrolled reference templates to determine an individual's identity. Identification is a "one-to-many" comparison that entails the comparison of a match template generated from a newly captured sample with all of the templates in the database. It is most often used to determine whether or not a person has previously enrolled in the system. It should be understood that embodiments described herein are not limited to providing biometric authentication of a message signer and content. Instead, the embodiments described herein may similarly be performed on other types of systems using other types of data. At the completion of 218, the relying party computing system 106 has a biometric match result from the BSP. If the biometric sample matches the associated biometric reference template, and the biometric match result is positive, the signing party is authenticated and the agreement is valid at 220. If the biometric sample does not match the associated biometric reference template, and the biometric match result is negative, the signing party is not authenticated and the agreement fails at 224

Figure 3:
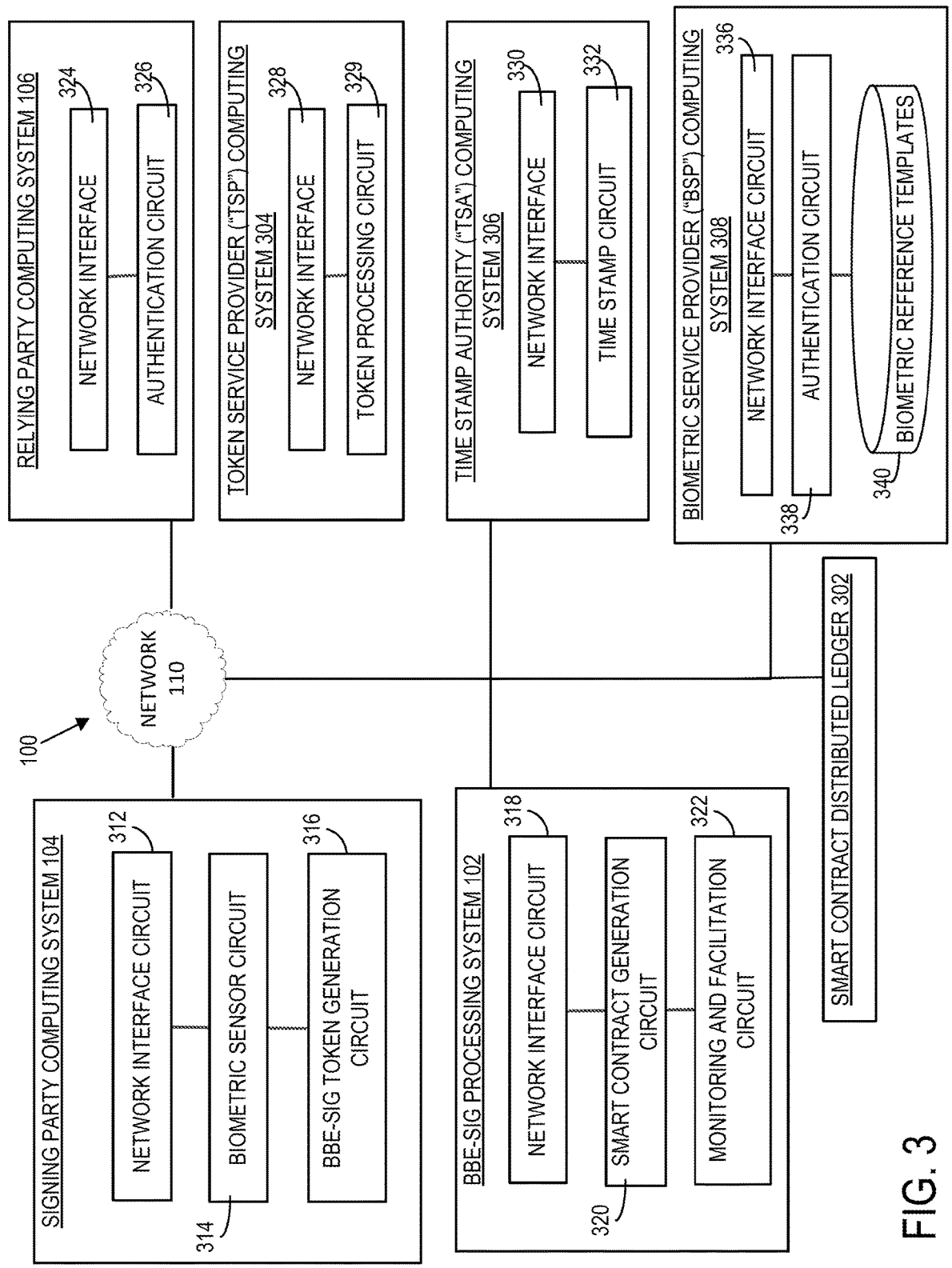
FIG. 3 is a schematic diagram of a BBE-Sig preauthorization and acceptance transfer system, according to an example embodiment.

FIG. 3 is a schematic diagram of the BBE-Sig preauthorization and acceptance transfer system 100, according to an example embodiment. The BBE-Sig preauthorization and acceptance transfer system 100 includes a BBE-Sig processing system 102, a signing party computing system 104, a relying party computing system 106, a smart contract distributed ledger 302, a TSP computing system 304, a TSA computing system 306, and a BSP computing system 308. Each of the BBE-Sig processing system 102, the signing party computing system 104, the relying party computing system 106, the smart contract distributed ledger 302, the TSP computing system 304, the TSA computing system 306, and the BSP computing system 308 is in operative communication with the other via a network 110. The mechanisms allow for the generation and verification of the identity of a signer of an electronic message via a biometric sample and key pair associated with an agreement and monitored by a smart contract (or similar remote procedure call) as described above in FIGS. 1 and 2. Specifically, the BBE-Sig preauthorization and acceptance transfer system 100 makes it possible for the identity of the signer to be verified by a relying party (e.g., merchant, financial institution, service provider, etc.) by digitally signing (e.g., signcryption, PAKE, tokenization, etc.) a biometric sample, an agreement, and additional content and attributes that facilitate the verification of the message signer (e.g., signing party) or are related to the agreement. The network 110 may include, for example, the Internet, cellular networks, proprietary cloud networks, telebiometric objects on the internet of things, and the like.

The BBE-Sig processing system 102 includes a network interface circuit 318, a smart contract generation circuit 320, and a monitoring and facilitating circuit 322. While shown separately in FIG. 3, in some arrangements, the BBE-Sig processing system 102 includes the smart contract distributed ledger 302. The BBE-Sig processing system 102 is structured to receive a BBE-Sig token or components of a BBE-Sig token from the signing party computing system 104 and generate a smart contract tailored to the BBE-Sig token. The BBE-Sig processing system 102 may include, for example, one or more servers each with one or more processors configured to execute instructions stored in a memory, send and receive data stored in the memory, and perform other operations to implement the financial services described herein associated with the processing modules, databases, and processes. The network interface circuit 318 is structured to facilitate operative communication between the BBE-Sig processing system 102 and other systems and devices over the network 110.

The smart contract generation circuit 320 can generate one or more smart contracts associated with an agreement, such as the smart contracts 20 described above. In one embodiment, the smart contract generation circuit 320 may be in communication with the signing party computing system 104, the relying party computing system 106 and the network 110 and can provide terms and conditions associated with the requested access economy good or service to the supplier (relying party) and the consumer (signing party). For example, basic terms and conditions may be set and transmitted to both the supplier and the consumer. If the supplier and consumer accept the terms and conditions, then the smart contract can be generated and executed. In other examples, the supplier and the consumer may be able to establish terms and conditions between themselves. In some embodiments, the smart contract generation circuit 320 automatically generates the smart contract. For example, the smart contract generation circuit 320 may include various algorithms to determine if a contract if the terms and/or conditions would be acceptable to a service provider that operates the BBE-Sig preauthorization and acceptance transfer system 100. If the smart contract generation circuit 320 determines that the terms and conditions meet the criteria set out by the service provider, the smart contract may be generated. In other embodiments, a service provider may be required to evaluate each potential smart contract before the smart contract generation circuit 320 is allowed to generate the smart contract. The smart contract generation circuit 320 may further be able to determine if a smart contract is permitted based on parameters associated with the supplier and the consumer. For example, factors, such as available balance, fee agreements, or other terms and/or conditions, may be deemed unsatisfactory to the smart contract generation circuit 320 based on information related to the supplier and the consumer. In some embodiments, the smart contract generation circuit 320 is structured to generate and deploy smart contracts on the smart contract distributed ledger 302.

The monitoring and facilitating circuit 322 is structured to monitor the performance of terms and conditions of the agreement. In some arrangements, the monitoring and facilitating circuit 322 monitors the smart contract distributed ledger 302 that is used to publish events or actions by the signing party or relying party in relation to the agreement. In other arrangements, the monitoring and facilitating circuit 322 monitors a similar repository over the network 110. Once a term or condition of the agreement is met, the monitoring and facilitating circuit 322 facilitates providing the BBE-Sig token to the relying party computing system 106.

The signing party computing system 104 includes a network interface circuit 312, a biometric sensor circuit 314, and a BBE-Sig token circuit 316. The network interface circuit 312 is structured to facilitate operative communication between the signing party computing system 104 and other systems and devices over the network 110. The signing party computing system 104 may include smartphones, tablet computing systems, laptop computing systems, desktop computing systems, PDAs, smart watches, smart glasses, tablets, etc.

The biometric sensor circuit 314 is structured to capture biometric data. For example, the sensor can be structured to read a fingerprint, voice print, or other biometric marker. Generally, the biometric sensor circuit 314 is any technology type that supports the capture of biometric data. The biometric sensor circuit 314 can be used to generate a biometric reference template or a biometric sample used for verification. In some arrangements, the raw biometric data captured by the biometric sensor circuit 314 needs to be further processed by a BSP to generate a biometric reference template. In some arrangements, a plurality of biometric samples captured from an individual are processed to create the biometric reference template.

The BBE-Sig token circuit 316 is structured to generate a BBE-Sig token including the signing party biometric and a hash of the agreement. In some arrangements, the BBE-Sig token may further include attributes that relate to the authentication of the signing party's biometric or digital signature and relate to the details of the agreement. The BBE-Sig may be generated using signcryption, a PAKE protocol utilizing a secret knowledge factor, or by tokenizing the biometric sample and cryptographically binding it to the hash of the agreement using a public/private key pair. The process of generating a BBE-Sig token is discussed in greater detail above in method 200 of FIG. 2.

The BBE-Sig token circuit 316 is structured to generate and retrieve (dependent on the method of digital signature used) one or more cryptographic keys to sign the hash of the agreement and biometric sample. For example, retrieving the public/private key pair is associated with a digital certificate in a PKI, for example, the X.509 certificate. In those arrangements, a key pair is generated (the private/public key pair must be generated together as they are mathematically related), the private key signs the public key, and the pair is summited to the certificate authority ("CA") or the front end registration authority that will then generate that public key certificate. Alternatively, the private/public key pair could be issued with a commercial CA, for example, one associated with a financial institution. In some arrangements, the signing party computing system 104 retrieves a public key certificate from the commercial certificate authority and uses the certificate to ascertain the public/private key pair. In other embodiments, the key generation circuit 116 generates an ephemeral public/private key pair not associated with a digital certificate in a PKI. In these embodiments, the public key can be included in the attributes of the BBE-Sig token, allowing a digital signature verifier to use the included public key component to verify message integrity. In these arrangements, the verifier will be able to verify message integrity (e.g., that it has not been modified), but will not gain origin authenticity assurance (e.g., know who signed the message and who possessed the private key component of the key pair). The BBE-Sig token circuit 316 may retrieve one or more public keys of relying party(s).

The relying party computing system 106 includes a network interface circuit 324 and a request circuit 326. Generally, the relying party computing system 106 receives a BBE-Sig token from the BBE-Sig processing system 102 or the smart contract distributed ledger 302 as part of an executed smart contract 20. In some arrangements, the smart contract distributed ledger 302 is a part of the BBE-Sig processing system 102, such that when a smart contract 20 determined performance of the agreement, the BBE-Sig processing system 102 facilitates the transmission of the BBE-Sig token to the relying party computing system 106. In other arrangements, the smart contract distributed ledger 302 is structured to facilities the transmission of the BBE-Sig token to the relying party computing system 106. Upon recipient of the BBE-Sig token the relying party computing system 106 verifies the identity of the message signer and the agreement information. With the received BBE-Sig token, the relying party computing system 106 is also able to verify data integrity, origin authenticity, and non-repudiation of the content within the BBE-Sig token and the BBE-Sig token as a whole. Specifically, if the biometric sample and biometric reference template produce a positive match value and the digital signature is verified, the relying party can trust the data integrity and origin authentication. Non-repudiation is achieved if each key pair is associated with a public key identity certificate. The network interface circuit 324 is structured to facilitate operative communication between the relying party computing system 106 and other systems and devices over the network 110.

The request circuit 326 is structured to facilitate the authentication of the biometric sample in a BBE-Sig token with a biometric reference template stored on the BSP computing system 308. In some arrangements, there is an application or web browser on the relying party computing system 106 that facilitates this process. For example, upon receiving the BBE-Sig token, the relying party computing system 106 automatically begins verification of the signature (and in the case of PAKE and signcrypted BBE-Sig tokens, unencrypts) the BBE-Sig token, and transfers the captured biometric sample to the BSP computing system 308 for matching. The biometric sample can be in the form of a simple oblique value (a string of octets) or structured content that contains the biometric data value and any information needed to recover the plaintext, such as the URL address of a biometric service provider or web service, an indication of the specific biometric processing technique that was used, and any other required data or authentication information. In some arrangements, the attribute of the digital signature message may be cryptographically bound to a hash of the biometric sample.

The TSP computing system 304 includes a network interface circuit 328 and a token processing circuit 329. The TSP computing system 304 may include, for example, one or more servers each with one or more processors configured to execute instructions stored in a memory, send and receive data stored in the memory, and perform other operations to implement the financial services described herein associated with the processing modules, databases, and processes. In some arrangements, some or all of the TSP computing system 304 is within the BSP computing system 308. The network interface circuit 328 is structured to facilitate operative communication between the TSP computing system 304 and other systems and devices over the network 110.

The token processing circuit 329 is structured to organize and facilitate the back-end process necessary to process any biometric samples received by the signing party computing system 104. Tokenization is a process in which a token is substituted as a proxy for data thereby obscuring the underlying data. Accordingly, a token is a surrogate value that can be used to replace some underlying sensitive value. The tokens may be generated, stored, and maintained by an entity that specializes in the tokenization process. The token processing circuit 329 is structured to tokenize and detokenize the biometric reference sample before the message is digitally signed. The token processing circuit 329 also facilitates the detokenization requests for the biometric sample by a relying party, either directly or indirectly. This includes the TSP receiving requests from a BSP that has received a matching request from a relying party containing the tokenized biometric sample. The token processing circuit 329 may contain rules generated from the TSP computing system 304, for example, the tokenization schemas used. The token processing circuit 329 is in communication with the token vault (not pictured) to store and retrieve the generated tokens. The token vault is structured to store the tokens generated by the token processing circuit 329 and retrieve the tokens.

The TSA computing system 306 includes a network interface circuit 330 and a time stamp circuit 332. The TSA computing system 306 is managed by any trusted time authority that can provide a TST for a piece of information or data entry. The trusted time authority can be one that complies with the X9.95 standard, or those defined in similar standards by ISO/IEC, and satisfies legal and regulatory requirements. In some embodiments, the TSA computing system 306 may be contained in, and controlled by, the BBE-Sig processing system 102 or the BSP computing system 308. The network interface circuit 330 is structured to facilitate operative communication between the TSA computing system 306 and the signing party computing system 104 over the network 110. The time stamp circuit 332 is structured to negotiate a trusted TST, which includes receiving a hash of a piece of information and generating a trusted TST for the information for future verification. In some arrangements, the TST is generated inter-device (e.g., capturing the system time, or mobile phone time) and the TST is stored as an attribute in an BBE-Sig token, either within the signcryption algorithm as an input or within a BBE-Sig token as an unsigned attribute that may have been previously signed.

The BSP computing system 308 includes a network interface circuit 336, an authentication circuit 338, and a biometric reference template (e.g., value) database 340. The network interface circuit 336 is structured to facilitate operative communication between the BSP computing system 308 and other systems and devices over the network 110. Generally, the BSP computing system 308 stores biometric reference templates for signing parties and handles biometric matching requests from relying parties. Before using the BBE-Sig preauthorization and acceptance transfer system 100, the signing party must have enrolled with the BSP and created a biometric reference template. In some embodiments, the biometric sample may only be transmitted by an employee of the BSP entering the data into a computing system (e.g., an employee terminal connected to the server of the BSP) during a person-to-person interaction. For example, the customer may walk into a branch location of the BSP and initiate the enrollment process via interaction with a teller. In other arrangements, the BBE-Sig preauthorization and acceptance transfer system may create a biometric reference template from the user-provided biometric sample so that the user can be enrolled in a biometric systems for subsequent biometric authentication or identification.

The biometric reference template database 340 is a plurality of signing party identifiers and corresponding biometric reference templates, which are a byproduct of the customer enrolling in the biometric service. The signing party identifier can be, for example, a signing party name, email address, phone number, or the actual name of the customer. The signing party identifier may be stored in the attributes or fields of an BBE-Sig token.

The authentication circuit 338 is structured to receive a biometric sample and an authentication request from the relying party computing system 106 over the network 110 and compare the received sample to a stored reference template. The authentication request includes a request for verification and/or identification. Verification is the process of comparing a match template against a specific reference template based on a claimed identity (e.g., signing party ID, account number). If the sample matches the reference template, the authentication circuit 338 transmits a positive authentication value to the relying party computing system 106. In some arrangements, the authentication circuit 338 will provide a negative matching value (e.g., indicator) if there is no matching signing party identifier in the biometric reference template database 340 or if the signing party does not have a biometric reference template for the biometric type of the biometric sample.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor that, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method, comprising:
   receiving, by a computing system, an agreement associated with a signing party;
   receiving, by the computing system, a first biometric sample captured from the signing party;
   receiving, by the computing system, a second biometric sample captured from a relying party associated with the agreement;
   generating, by the computing system, a hash of the agreement;
   receiving, by the computing system, a secret knowledge factor from the signing party;
   generating, by the computing system, an encryption key using the secret knowledge factor as an input to a password authenticated key exchange protocol;
   generating, by the computing system, a biometric-based electronic signature token by encrypting the first biometric sample, the second biometric sample, and the hash of the agreement with the encryption key, the biometric-based electronic signature token comprising the encrypted first biometric sample, the encrypted second biometric sample, and the hash of the agreement and a signing party identifier associated with the secret knowledge factor,
   wherein the biometric-based electronic signature token can be verified using a decryption key generated using a stored knowledge factor as an input to the password authenticated key exchange protocol, the stored knowledge factor retrieved based on the signing party identifier, and
   wherein identity of the signing party can be authenticated by decrypting the encrypted first biometric sample from the biometric-based electronic signature token using the decryption key, and matching the decrypted first biometric sample with a biometric reference template associated with the signing party identifier;
   generating, by the computing system, a smart contract based on the agreement, the smart contract comprising:
      terms of the agreement, and
      the biometric-based electronic signature token, the biometric-based electronic signature token providing biometric-based pre-authorization by the signing party of a payment to be initiated by the smart contract in response to detecting performance of at least one of the terms of the agreement; and
   encrypting, by the computing system, an agreement location identifier with the encryption key so as to cryptographically bind the agreement location identifier with each of the hash of the agreement and the first biometric sample,
      wherein the biometric-based electronic signature token further comprises the encrypted agreement location identifier, and
      wherein the agreement location identifier references a location where the agreement is stored.

2. The method of claim 1, wherein the biometric-based electronic signature token further comprises an unsigned attribute component, the unsigned attribute component provides a plaintext version of the terms of the agreement for monitoring.

3. The method of claim 1, wherein:
   the biometric-based electronic signature token further comprises an unsigned attribute component comprising at least one of:
      a service provider identifier,
      a signing party account number, or
      a unique signing party identifier; and
   the service provider identifier represents a service provider that has the biometric reference template associated with the signing party.

4. The method of claim 1, wherein the encryption key is a symmetric encryption key generated using a Diffie-Hellman encryption algorithm.

5. The method of claim 1, wherein receiving the secret knowledge factor comprises extracting, by the computing system, secret knowledge data of the secret knowledge factor from data received from the signing party, the received data comprising the secret knowledge data and biometric matching data.

6. A system for carrying out a value transfer, the system comprising:
   one or more processors; and
   one or more non-transitory machine readable media with instructions stored thereon that, when executed by the one or more processors, cause the system to:
      receive an agreement associated with a signing party,
      receive a first biometric sample captured from the signing party,
      receive a second biometric sample captured from a relying party associated with the agreement,
      generate a hash of the agreement,
      receive a secret knowledge factor from the signing party,
      generate an encryption key using the secret knowledge factor as an input to a password authenticated key exchange protocol,
      generate a biometric-based electronic signature token by encrypting the first biometric sample, the second biometric sample, and the hash of the agreement with the encryption key, the biometric-based electronic signature token comprising the encrypted first biometric sample, the encrypted second biometric sample, and the hash of the agreement and a signing party identifier associated with the secret knowledge factor,
      wherein the biometric-based electronic signature token can be verified using a decryption key generated using a stored knowledge factor as an input to the password authenticated key exchange protocol, the stored knowledge factor retrieved based on the signing party identifier, and
      wherein identity of the signing party can be authenticated by decrypting the encrypted first biometric sample from the biometric-based electronic signature token using the decryption key, and matching the decrypted first biometric sample with a biometric reference template associated with the signing party identifier;
      generate a smart contract based on the agreement, the smart contract comprising:
         terms of the agreement, and
         the biometric-based electronic signature token, the biometric-based electronic signature token providing biometric-based pre-authorization by the signing party of a payment to be initiated by the smart contract in response to detecting performance of at least one of the terms of the agreement; and encrypt an agreement location identifier with the encryption key so as to cryptographically bind the agreement location identifier with each of the hash of the agreement and the first biometric sample, wherein the biometric-based electronic signature token further comprises the encrypted agreement location identifier, and wherein the agreement location identifier references a location where the agreement is stored.

7. The system of claim 6, wherein the biometric-based electronic signature token further comprises an unsigned attribute component, the unsigned attribute component provides a plaintext version of the terms of the agreement for monitoring.

8. The system of claim 6, wherein:
the biometric-based electronic signature token further comprises an unsigned attribute component comprising is at least one of:
a service provider identifier,
a signing party account number, or
a unique signing party identifier; and
the service provider identifier represents a service provider that has the biometric reference template associated with the signing party.

9. The system of claim 6, wherein the encryption key is a symmetric encryption key generated using a Diffie-Hellman encryption algorithm.

10. The system of claim 6, wherein receiving the secret knowledge factor comprises extracting secret knowledge data of the secret knowledge factor from data received from the signing party, the received data comprising the secret knowledge data and biometric matching data.

11. One or more non-transitory computer readable media having computer-executable instructions embodied therein that, when executed by one or more computing systems, cause the one or more computing systems to perform operations, the operations comprising:
receiving an agreement associated with a signing party;
receiving a first biometric sample captured from the signing party;
receiving a second biometric sample captured from a relying party associated with the agreement;
generating a hash of the agreement;
receiving a secret knowledge factor from the signing party;
generating an encryption key using the secret knowledge factor as an input to a password authenticated key exchange protocol;
generating a biometric-based electronic signature token by encrypting the first biometric sample, the second biometric sample, and the hash of the agreement with the encryption key, the biometric-based electronic signature token comprising the encrypted first biometric sample, the encrypted second biometric sample, and the hash of the agreement and a signing party identifier associated with the secret knowledge factor, wherein the biometric-based electronic signature token can be verified using a decryption key generated using a stored knowledge factor as an input to the password authenticated key exchange protocol, the stored knowledge factor retrieved based on the signing party identifier, and wherein identity of the signing party can be authenticated by decrypting the encrypted first biometric sample from the biometric-based electronic signature token using the decryption key, and matching the decrypted first biometric sample with a biometric reference template associated with the signing party identifier;

generating a smart contract based on the agreement, the smart contract comprising:
terms of the agreement, and
the biometric-based electronic signature token, the biometric-based electronic signature token providing biometric-based pre-authorization by the signing party of a payment to be initiated by the smart contract in response to detecting performance of at least one of the terms of the agreement; and encrypting an agreement location identifier with the encryption key so as to cryptographically bind the agreement location identifier with each of the hash of the agreement and the first biometric sample, wherein the biometric-based electronic signature token further comprises the encrypted agreement location identifier, and wherein the agreement location identifier references a location where the agreement is stored.

12. The one or more non-transitory computer readable media of claim 11, wherein the biometric-based electronic signature token further comprises an unsigned attribute component, the unsigned attribute component provides a plaintext version of the terms of the agreement for monitoring.

13. The one or more non-transitory computer readable media of claim 11, wherein:
the biometric-based electronic signature token further comprises an unsigned attribute component comprising at least one of:
a service provider identifier,
a signing party account number, or
a unique signing party identifier; and
the service provider identifier represents a service provider that has the biometric reference template associated with the signing party.

14. The one or more non-transitory computer readable media of claim 11, wherein the encryption key is a symmetric encryption key generated using a Diffie-Hellman encryption algorithm.

* * * * *